United States Patent [19]
Rohs et al.

[11] Patent Number: 5,839,962
[45] Date of Patent: Nov. 24, 1998

[54] TORSIONAL OSCILLATION DAMPER

[75] Inventors: Ulrich Rohs, Düren; Dietmar Heidingsfeld, Aachen, both of Germany

[73] Assignee: Patentverwertungsgesellschaft Rohs Voigt mbh, Düren, Germany

[21] Appl. No.: 823,530

[22] Filed: Mar. 24, 1997

[30] Foreign Application Priority Data

Mar. 22, 1996 [DE] Germany .......................... 196 11 268.0
Jan. 31, 1997 [DE] Germany .......................... 197 03 534.4

[51] Int. Cl.$^6$ ................................ F16D 1/12; F16F 15/30
[52] U.S. Cl. ................................ 464/68; 464/1; 192/201; 192/214.1
[58] Field of Search ................................ 464/1, 3, 66, 68; 192/201, 214.1, 206

[56] References Cited

U.S. PATENT DOCUMENTS

| | | | |
|---|---|---|---|
| 3,296,887 | 1/1967 | Larsen | 192/201 X |
| 4,638,684 | 1/1987 | Maucher | 192/201 X |
| 5,201,394 | 4/1993 | Suzuki | 192/201 |
| 5,362,276 | 11/1994 | Fuehrer et al. | 464/68 X |

Primary Examiner—Thomas R. Hannon
Attorney, Agent, or Firm—Henry M. Feiereisen

[57] ABSTRACT

A torsional oscillation damper includes a primary part resiliently secured via tangential compression springs to a secondary part mounted on a driven member. Provided between the primary part and the secondary part is a friction unit which is so acted upon by a rotating actuator that the value of friction decreases with increasing speed.

10 Claims, 4 Drawing Sheets

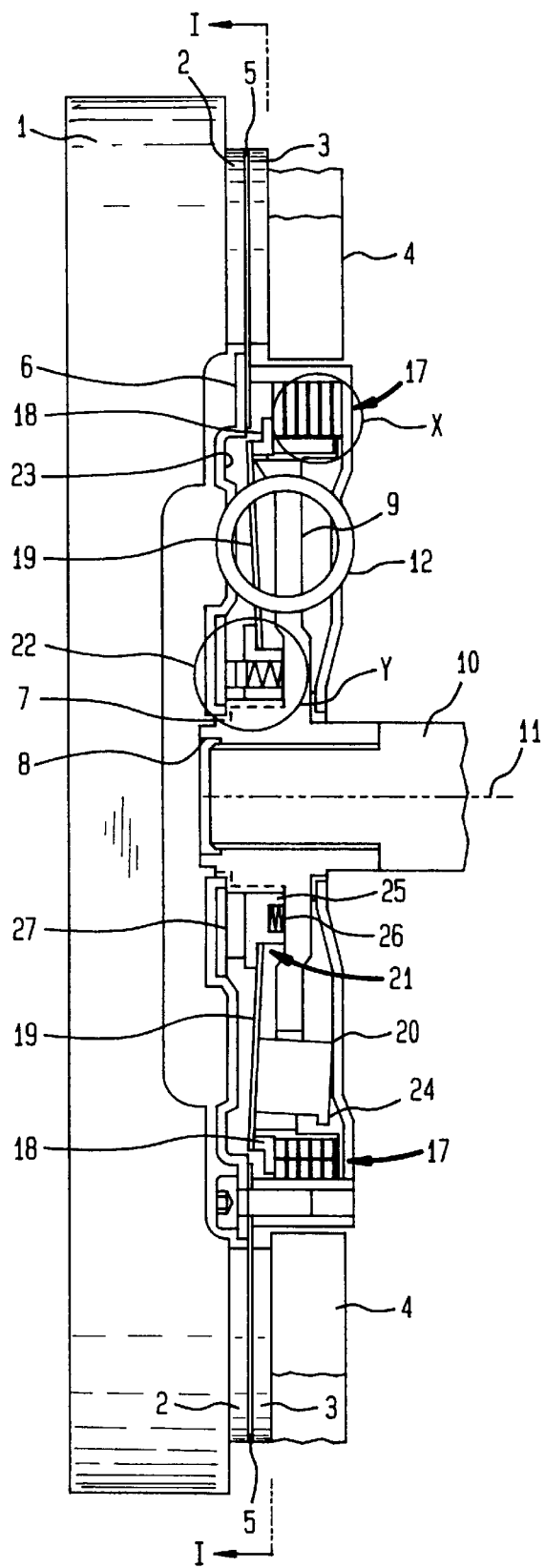
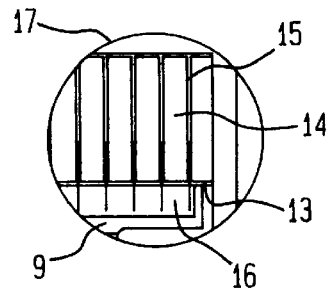
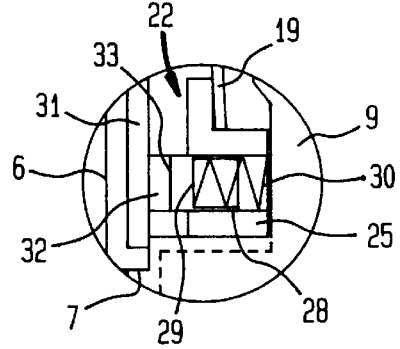
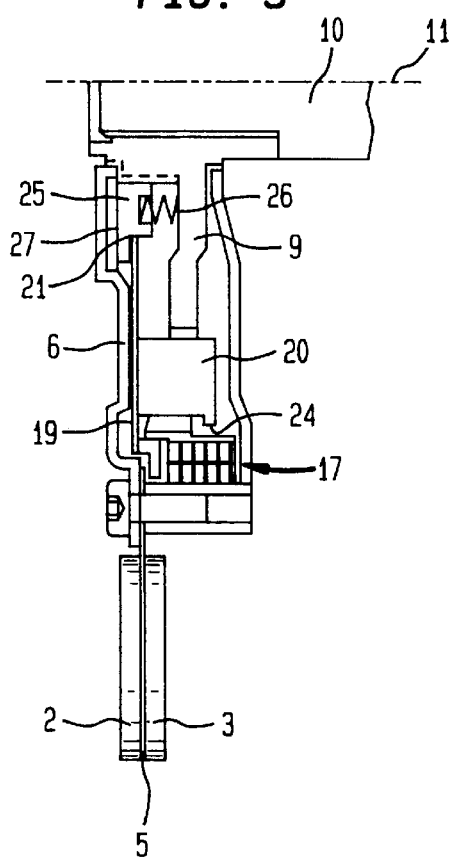

TORSIONAL OSCILLATION DAMPER

BACKGROUND OF THE INVENTION

The present invention refers generally to a torsional oscillation damper, and more particularly to a torsional oscillation damper generally located between the engine and the transmission or other output unit of a motor vehicle to absorb torsional vibrations as generated e.g. by engine firing pulsations.

Conventional torsional oscillation dampers, especially those of the friction disk damper type, have the problem that the eigenfrequency of the damper is in the speed range of the internal combustion engine whose torsional vibrations are supposed to be attenuated. Studies have shown that resonant vibration occurs at a low engine speed i.e. subcritical speed range so that a large value of damping action is required to suppress the vibration because otherwise the eigenfrequency of the torsional oscillation damper leads to a significant excess of rotational accelerations in relation to the primary side. In the supercritical speed range, i.e. at an engine speed of approximately above 3000 rpm, any damping action is undesired so that a relative movement between the primary and secondary sides is effected free of any friction. Thus, a torsional oscillation damper should provide a large value of friction at low engine speed, and change its operational characteristics with increasing engine speed so as to eliminate any friction when the speed exceeds the supercritical range of e.g. 3000 rpm.

Conventional friction disk dampers are so designed as to provide only a constant value of friction force, generated by interlocked, spring-loaded cones. If the value of friction is large, the excess of rotational acceleration between the primary and secondary sides is eliminated or only of slight degree in the subcritical speed range. While this is desired, the resonant vibration transmitted to the secondary side at higher engine speed in the supercritical range is impermissibly high. Although selection of a friction disk damper exhibiting a different value of friction force may effect a slight damping action to theoretically overcome this problem at higher engine speeds, the trade-off is a significant, undesired, increase of the rotational accelerations between the primary and secondary sides will then be experienced in the subcritical speed range. Thus, friction disk dampers effecting a constant damping action are unsuitable for use in the entire speed range.

In general, the use of mechanical friction disk dampers is desired because they can be produced in a rather inexpensive way.

U.S. Pat. No. 3,296,887, issued on Jan. 10, 1967, discloses a torsional oscillation damper in which a driving member (primary part) is connected to an engine crankshaft, and a driven member (secondary part) is connected to a transmission or other unit. A plurality of mass elements are pivotally secured to the driving member and have friction arms adapted to engage the driven member in such a manner that at low engine speed the friction will prevent rotation of the driven member relative to the driving member. At high engine speed, centrifugal forces cause a movement of the mass elements to remove the friction arms from the driven member to permit compression springs to take up the engine vibrations. A torsional oscillation damper of this type has the drawback that varying forces act on the friction unit depending on the direction of rotation and friction moment. Thus, the damping action cannot be adjusted to practical needs. Moreover, the friction unit demands much structural space in the radially outer area of the torsional oscillation damper.

SUMMARY OF THE INVENTION

It is an object of the present invention to provide an improved torsional oscillation damper, obviating the aforestated drawbacks.

In particular, it is an object of the present invention to provide an improved torsional oscillation damper for use in the entire speed range so that in the subcritical speed range very small forces are exerted to effect a highest possible damping action while in the supercritical speed range a smallest possible, speed-dependent damping action is attained.

It is still another object of the present invention to provide an improved torsional oscillation damper which is so configured that the demand for additional structural space is minimized and thereby allows use of the torsional oscillation damper as replacement of conventional oscillation dampers.

It is yet another object of the present invention to provide an improved torsional oscillation damper which effects not only a speed-dependent damping action but permits in addition a torque-dependent control mechanism.

These objects, and others which will become apparent hereinafter, are attained in accordance with the present invention by positioning a friction unit between the primary part and the secondary part for damping torsional oscillations in dependence on a rotational speed, and providing an actuating mechanism which includes at least one actuator connected to a centrifugal governor and conjointly rotating with the primary part or the secondary part, with the centrifugal governor so acting on the friction unit in axial direction that a damping action decreases with increasing rotational speed.

Through the provision of a friction unit in conjunction with an actuating unit that operates in dependence on the engine speed, the friction unit exerts a value of friction which decreases with increasing speed and can be so adjusted that the friction force decreases to zero when the critical speed is exceeded. The damping action is independent from the direction of rotation as a consequence of the flyweight that acts in axial direction upon the friction unit. The friction unit requires a minimum of space in the radially outer area of the torsion oscillation damper and thus enables also a disposition of the compression springs in the radially outer region.

At rising torque being transmitted, the relative torsional angle between the primary part and the secondary part of the torsional oscillation damper increases. By incorporating a torque converter in the actuating unit, the actuator is superimposed by a torque-dependent control mechanism, with the torque converter bearing upon the actuator for displacing the actuator in axial direction in dependence on an angle of rotation between the primary part and the secondary part. Preferably, the torque converter includes a ring secured on the hub of the secondary part and loaded by an axial spring towards an opposite axial wedge which has a part positioned in a cross sectional plane in correspondence with a particular angle of rotation between the primary part and the secondary part, whereby the angle of rotation represents a "dead angle" and causes no axial force upon the torque converter.

According to another feature of the present invention, the friction unit is formed by a stack of lamellar ring-shaped plates comprised of a first array of spaced-apart plates so arranged in succession in axial direction on the primary part as to be displaceable in the axial direction, and a second array of spaced-apart plates secured to the secondary part and shiftable in axial direction, with the first array of plates being in interfitting engagement with the second array of plates. The actuator may be formed by a leaf spring having an outer end bearing upon the stack of lamellar ring-shaped plates and supporting the flyweight.

According to yet another feature of the present invention, the torsional oscillation damper has incorporated therein a centering unit for restoring a relative centered disposition between the primary and secondary part during engine idling, with the centering unit including a spring-biased centering piston resiliently supported by the secondary part and movable in axial direction, with the centering piston having flanks bearing upon wedge-shaped surfaces of the primary part.

BRIEF DESCRIPTION OF THE DRAWING

The above and other objects, features and advantages of the present invention will now be described in more detail with reference to the accompanying drawing in which:

FIG. 2 is an axial longitudinal section of the a torsional oscillation damper, taken along the line II–ll in FIG. 1 and showing the friction unit in a first position for effecting a full damping action in subcritical speed range;

FIG. 3 is a cutaway view of the torsional oscillation damper in supercritical speed range, with the friction unit occupying a second position in which friction is reduced to a minimum;

FIG. 4 is a cutaway view, on an enlarged scale, of a detail X in FIG. 2;

FIG. 5 is a cutaway view, on an enlarged scale, of a detail Y in FIG. 2, illustrating a centering unit at idle engine;

DETAILED DESCRIPTION OF PREFERRED EMBODIMENTS

Figure 1:
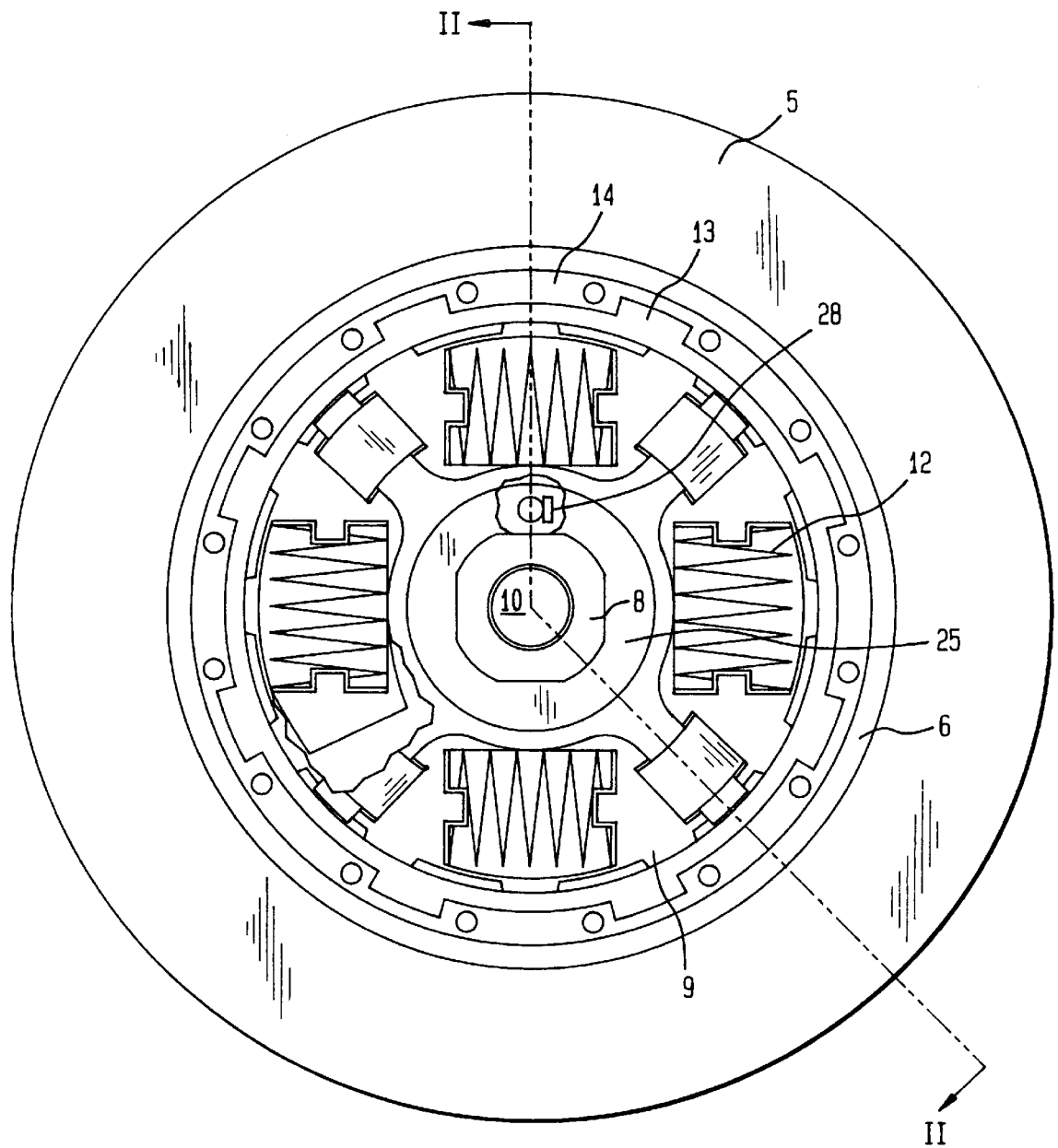
FIG. 1 is a cross sectional view of one embodiment of a torsional oscillation damper in accordance with the present invention, taken along the line I–I in FIG. 2 and with parts being broken away.

Turning now to the drawing, and in particular to FIGS. 1 to 6, there is shown a first embodiment of a torsional oscillation damper, including a flywheel 1 positioned at the input side and provided with friction elements 2 for cooperation with friction elements 3 of a clutch 4 at the output side. The clutch 4 is illustrated only schematically for sake of simplicity and includes a sheet metal ring 5 interposed between the facing rubbing surfaces of the friction elements 2, 3 and forming a component of a primary part 6 of the torsional oscillation damper. The primary part 6 is formed by a hollow disk-shaped housing which is rotatably mounted via plastic bearings 7 on a hub 8 of a secondary part 9, with the hub 8 being secured on a driven shaft 10 positioned at the output side of the oscillation damper and rotating about an axis 11.

The secondary part 9 is of substantially disk-shaped configuration and supported in generally centered disposition within an annular chamber 23 of the primary part 6. A plurality of tangentially arranged, relatively large compression springs 12 are positioned at a radial distance to the axis of rotation 11 and received in pockets of the primary part 6 so as to resiliently couple the primary part 6 with the secondary part 9. The compression springs 12 are so arranged as to permit a clearance over an "inactive torsional angle" of e.g. 5° between the primary part 6 and the secondary part 9.

Supported about the perimeter of the secondary part 9 is a stack of lamellar ring-shaped plates comprised of a first array of thin plates 13 in spaced-apart relation and a second array of wider plates 14 in spaced-apart relation and projecting between the plates 13. As shown in particular in FIG. 4, the plates 13 are arranged successively in axial direction and secured to an axial external toothing 16 of the secondary part 9 for displacement in an axial direction, while the plates 14 are secured to an axial internal toothing 15 of the primary part 6 for displacement in an axial direction and conjoint movement with the primary part 6. The stack of lamellar ring-shaped plates 13 and 14 exhibit a very large rubbing surface and form together a friction unit 17 by which torsional oscillations in the subcritical speed range can be absorbed by very small forces. The stack of plates 13, 14 has a flywheel-distal back side which is supported by the primary part 6 and a flywheel-proximal front side which is engaged by an axially shiftable pressure ring 18.

Disposed in a space between the pressure ring 18 and the facing inner wall surface of the primary part 6 are radial leaf springs 19 which have radial outer ends supporting a centrifugal governor in form of flyweights 20. The leaf springs 19 form part of an actuating unit for controlling the friction force applied by the friction unit 17. In the position of the torsional oscillation damper as shown in FIG. 2, the leaf springs 19 are urged by the flyweights 20 in direction toward the friction unit 17 so as to press against the pressure ring 18, thereby producing a high value of friction force between the axial shifting plates 13, 14 while applying only very small spring forces, whereby the stack of plates 13, 14 is slightly shifted to the right. In this position of the friction unit 17, a relative rotation of the primary part 6 relative to the secondary part 9 is thus prevented.

The leaf springs 19 and the flyweights 20 are so adjusted as to move to the left and thereby disengage from the pressure ring 18 when the speed reaches a critical level, e.g. at approximately 3000 rpm. Thus, the friction between the rubbing surfaces of the plates 13, 14 is removed, as indicated in FIG. 3, so that the damping action applied by the friction unit 17 is controlled in dependence on the speed from a maximum level in the subcritical speed range to a minimum, i.e. zero, in the supercritical speed range. At about 4000 rpm, the flyweights 20 impact on a stop member 24 formed on the secondary part 9 in order to protect the leaf springs 19 from excessive stress.

Figure 6:
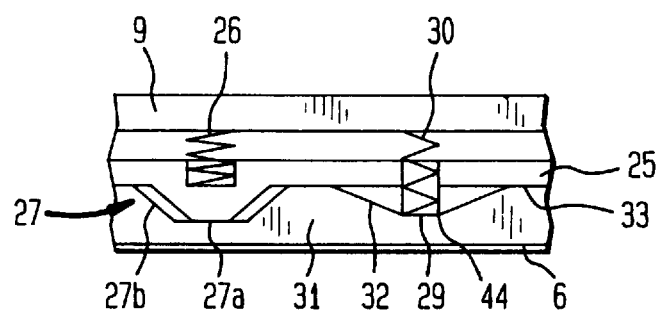
FIG. 6 is a sectional view of the centering unit of FIG. 5.

As best seen in FIG. 2, the leaf springs 19 have inner ends secured to a plastic ring 25 which is so rotatably mounted on the hub 8 via an axial toothing as to conjointly rotate with the hub 8 and to be able to shift in axial direction. The flywheel-distal back side of the plastic ring 25 is supported by the secondary part 9 via axial springs 26 to load the plastic ring 25 in such a manner that its front side is pressed against tangential axial wedges 27 secured to the primary part 6, as best shown in FIG. 6. As soon as the relative angle of rotation between the primary and secondary parts 6, 9 significantly changes as a consequence of a torque being transmitted, the plastic ring 25 shifts in axial direction along the hub 8 of the secondary part 9 relative to the axial wedges 27 about this angle of rotation, thereby displacing the leaf springs 19 to a slight extent in axial direction so that the speed-dependent preload force of the leaf springs 19 is superimposed by a load-dependent component of the preload force. The axial wedges 27 and the plastic ring 25 thus form a torque converter, which is generally designated by reference numeral 21.

As shown in FIG. 6, the axial wedges 27 are so configured as to form a surface area 27a which is parallel to a cross sectional area and terminates on both ends in wedge-like slopes 27b. Suitably, the junction between the surface area 27a and the slopes 27b may be formed of arched configuration. In this manner, an initial relative rotation between the primary and secondary parts 6, 9 as a consequence of the clearance between these parts 6, 9 and the tangential compression springs 12 does not result in a reaction by the torque converter 21. This torsional angle is called "dead angle" and should be smaller than the "inactive torsional angle" as effected by the clearance of the tangential compression springs 12.

FIG. 2 shows the leaf springs 19 in the subcritical speed range but at transmission of the full torque, with the full preload force acting upon the stack of plates 13, 14. FIG. 3 shows the position of the leaf springs 19 at high engine speed, i.e. thus in the supercritical speed range, so that the flyweights 20 as a result of the centrifugal forces generated by the rotation of the structure remove the leaf springs 19 from the stack of plates 13, 14 and disengage the rubbing surfaces between the plates 12, 13 from one another, thereby removing any friction action. In this state, the torque converter 21, too, is in its idle position, i.e. the plastic ring 25 is shifted to the left.

As best seen from FIG. 5, the plastic ring 25 is acted upon by a centering unit, generally designated by reference numeral 22 for centering the primary and secondary parts 6, 9 to one another when the engine runs idle. The centering unit 22 is effected by forming the plastic ring 25 with axial bores 28 extending inwardly from the flywheel-distal end face of the plastic ring 26. Each of the bores 28 has accommodated therein a centering piston 29 which is loaded by a compression spring 30 extending between the piston 29 and the inside wall surface of the secondary part 9. The centering piston 29 is loaded by the compression spring 30 in direction toward a flat keyway 44 formed in a disk 31 which is press-fitted in a recess of the primary part 6 and carries the axial wedges 27 (see also FIG. 6). The disk 31 is formed in the area of the centering piston 29 with lobes 32 exhibiting sloped planes on both sides of the keyway 44 for the piston 29, with the wedged planes terminating in a surface 33 oriented in parallel relation to the cross sectional plane.

During idle running, slight relative rotations between the primary part 6 and the secondary part 9 may be encountered. As the spring-biased centering piston 29 moves upon the keyway, a restoring force is generated for centering the primary part 6 and the secondary part 9 to one another.

Figure 7:
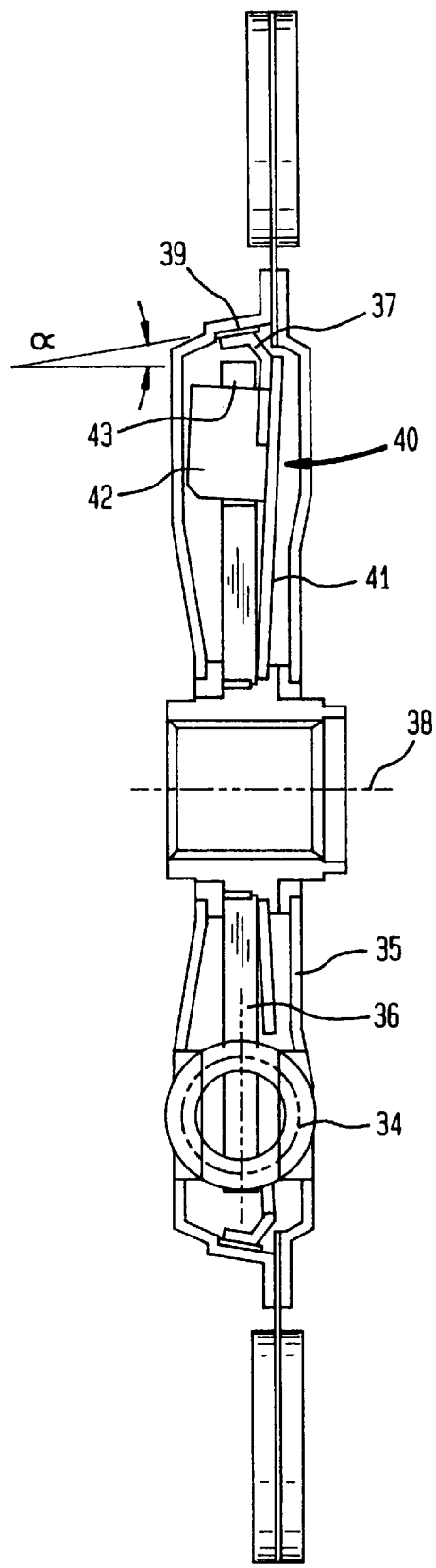
FIG. 7 is an axial longitudinal section of another embodiment of a torsional oscillation damper in accordance with the present invention in subcritical speed range.

Turning now to FIG. 7, there is shown an axial longitudinal section of another embodiment of a torsional oscillation damper in accordance with the present invention, with the torque being transmitted from a primary part 35 to a secondary part 36 by springs 34, in a same manner as described with the embodiment of FIGS. 1 to 6. In contrast to the previous embodiment, the embodiment according to FIG. 7 effects a damping action by means of a friction element 37 which is actuated by the secondary part 36. The friction element 37 extends at an acute angle a with respect to the drive shaft 38 and can be pressed against a rubbing surface 39 positioned at the perimeter of the primary part 35.

Figure 9:
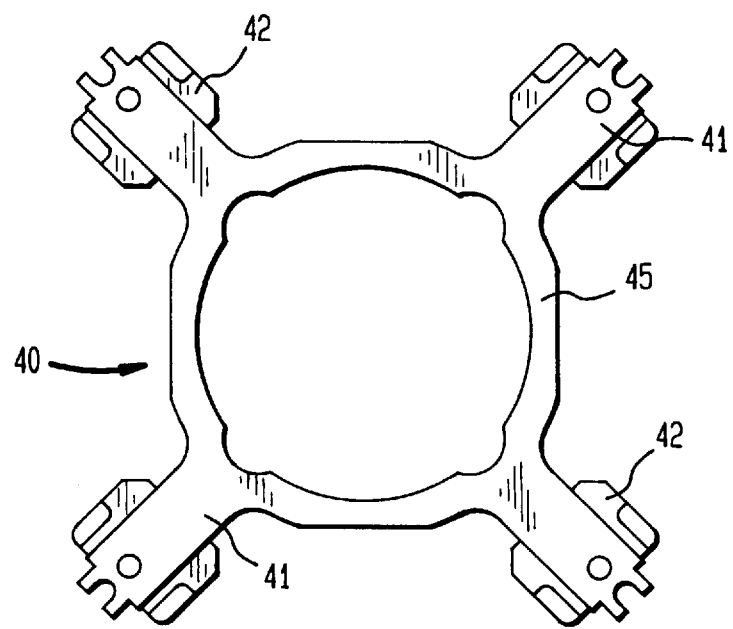
FIG. 9 is an exemplified plan view of a spider spring as incorporated in the torsional oscillation damper of FIG. 7.

The preload force required for effecting a damping action is applied by a spider spring 40 which is formed with a substantially ring-shaped member 45 for attachment to the drive shaft 38. As best seen in FIG. 9, the ring-shaped member 45 is formed with four fingers 41 projecting outwards and evenly spaced about the circumference to act upon the friction element 37. In the embodiment of the torsional oscillation damper of FIG. 7, the friction element 37 exhibits a conical configuration. Each finger 41 supports a flyweight 42 which, due to centrifugal forces, moves the spider spring 40 in opposition to its spring force at a speed of 3000 rpm so that the preload of the friction element 37 and thus the damping action is decreased to almost zero. At about 4000 rpm, the flyweight 42 impacts an outer stop 43 of the secondary part 36 in order to protect the spider spring 40 from excess stress.

Figure 8:
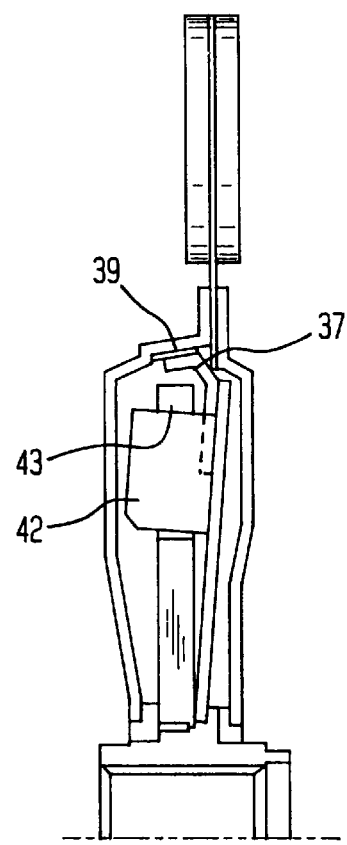
FIG. 8 is a cutaway view of an upper section of the torsional oscillation damper of FIG. 7 in supercritical speed range.

The disengagement of the spider spring 40 at high speeds as a consequence of centrifugal forces applied on the flyweight 42 is shown in FIG. 8, in which the friction element 37 is fully separated from the rubbing surface 39. A further displacement of the friction element 37 in axial direction to the right is limited by the stop member 43 upon which the flyweight 42 impacts.

While the invention has been illustrated and described as embodied in a torsional oscillation damper, it is not intended to be limited to the details shown since various modifications and structural changes may be made without departing in any way from the spirit of the present invention.

What is claimed as new and desired to be protected by Letters Patent is set forth in the appended claims:

1. A torsional oscillation damper, comprising:
   a primary part;
   a secondary part rotatable with respect to the primary part;
   spring means disposed tangentially between the primary part and the secondary part for resiliently connecting the primary part with the secondary part;
   friction-applying means positioned between the primary part and the secondary part for damping torsional oscillations in dependence on a rotational speed; and
   actuating means so acting on the friction-applying means that a damping action decreases with increasing rotational speed, said actuating means including at least one actuator connected to a centrifugal governor and conjointly rotating with the primary or secondary parts, with the centrifugal governor acting on the friction-applying means in axial direction.

2. The damper of claim 1 wherein the spring means includes tangential compression springs fitted between the primary part and the secondary part at a clearance to thereby defining an inactive torsional angle between the primary part and the secondary part.

3. The damper of claim 1 wherein the centrifugal governor includes flyweights connected to the secondary part, said friction-applying means including a first friction element acted upon by the secondary part in direction against the primary part.

4. The damper of claim 3 wherein the friction element is disposed at an acute angle relative to a drive shaft and is loaded in direction of the primary part against a rubbing surface thereof which extends at an acute angle to the drive shaft.

5. The damper of claim 1 wherein the friction-applying means is formed by a stack of lamellar ring-shaped plates comprised of a first array of plates so arranged in succession in axial direction on the primary part as to be displaceable in the axial direction, and a second array of plates secured to the secondary part and shiftable in axial direction, said first array of plates being in interfitting engagement with the second array of plates, said actuator being formed by a leaf spring having an outer end bearing upon the stack of lamellar ring-shaped plates and supporting the flyweight.

6. The damper of claim 1 wherein the actuator is guided on the primary part or secondary part for displacement in an axial direction, and further comprising a torque converter bearing upon the actuator for moving the actuator in the axial direction in dependence on an angle of rotation between the primary part and the secondary part.

7. The damper of claim 6 wherein the secondary part includes a hub supporting the actuator, said torque converter including a ring secured on the hub and loaded by an axial spring towards an opposite axial wedge.

8. The damper of claim 7 wherein the axial wedge has a surface area positioned in a cross sectional plane and commensurate with a particular angle of rotation between the primary part and the secondary part, which angle of rotation represents a "dead angle" and causes no axial force upon the torque converter.

9. The damper of claim 8 wherein the dead angle of the torque converter is smaller than an inactive torsional angle of the spring means.

10. The damper of claim 1, and further comprising centering means for restoring a relative centered disposition between the primary and secondary parts during idling, said centering means including a spring-biased centering piston resiliently supported by the secondary part and movable in axial direction, said centering piston having flanks bearing upon wedge-shaped surfaces of the primary part.

* * * * *